United States Patent
Bhattarai

(10) Patent No.: US 7,331,327 B2
(45) Date of Patent: Feb. 19, 2008

(54) ZONE BASED KNOCK REDUCTION SYSTEMS AND METHODS FOR BELT ALTERNATOR STARTER HYBRID SYSTEMS

(75) Inventor: Birendra P. Bhattarai, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/491,482

(22) Filed: Jul. 21, 2006

(65) Prior Publication Data

US 2008/0017167 A1    Jan. 24, 2008

(51) Int. Cl.
*F02P 5/15*    (2006.01)
(52) U.S. Cl. .................................................. 123/406.3
(58) Field of Classification Search ............. 123/406.3, 123/406.32, 406.29
See application file for complete search history.

(56) References Cited

U.S. PATENT DOCUMENTS

| | | | | |
|---|---|---|---|---|
| 4,594,983 A | * | 6/1986 | Takahashi et al. | ....... 123/406.3 |
| 4,619,236 A | * | 10/1986 | Okada et al. | ............ 123/406.3 |
| 4,945,876 A | * | 8/1990 | Nakaniwa | ................ 123/406.3 |
| 5,012,782 A | * | 5/1991 | Tokuda | ..................... 123/406.3 |
| 5,131,370 A | * | 7/1992 | Chikamatsu et al. | .. 123/406.32 |

FOREIGN PATENT DOCUMENTS

JP    3-138457 A    *    6/1991

* cited by examiner

*Primary Examiner*—Hieu T. Vo

(57) ABSTRACT

A knock reduction system for an internal combustion engine is provided. The system includes an engine operating zone selection module that selects a current engine operating zone from a plurality of engine operating zones based on engine speed, air per cylinder, and barometric pressure. A knock detection module generates a knock detection signal based on a detection of engine knock. An octane scaler adaptation module computes an octane scaler based on the current engine operating zone and the knock detection signal wherein engine spark is controlled based on the octane scaler.

24 Claims, 7 Drawing Sheets ed States Patent US 7,331,327 B2

ZONE BASED KNOCK REDUCTION SYSTEMS AND METHODS FOR BELT ALTERNATOR STARTER HYBRID SYSTEMS

FIELD

The present disclosure relates to engine control methods and systems for Belt Alternator Starter hybrid systems.

BACKGROUND

The statements in this section merely provide background information related to the present disclosure and may not constitute prior art.

Vehicles can include an internal combustion engine that generates drive torque to drive wheels. More specifically, the engine draws in air and mixes the air with fuel to form combustion mixtures. The combustion mixtures are compressed within cylinders and are combusted to drive pistons that are disposed within respective cylinders. The pistons rotatably drive a crankshaft to transfer drive torque to a driveline and ultimately to the wheels.

Modern engine control systems are designed to minimize exhaust emissions while maximizing power and fuel economy. Advancements in spark timing for a given air/fuel ratio are made to increase power and improve fuel economy. In general, advancing the spark relative to top dead center increases torque until a point is reached at which best torque is produced. Abnormal combustion, also known as engine knock, occurs when the spark is advanced too far. The temperature and pressure of the unburned air/fuel mixture exceeds a critical level causing the gases to auto ignite. This combustion produces a shock wave that generates a rapid increase in cylinder pressure. Damage to pistons, rings, and exhaust valves can result if sustained heavy knock occurs. Additionally, most people find the sound of heavy engine knock undesirable.

Conventional knock detection systems include a knock sensor and a dedicated knock detection chip (knock IC) to process the knock sensor signal and calculate the engine knock intensity. An individual knock sensor and knock IC can be used to detect knock from each cylinder. Conventional knock reduction systems detect knock during certain drive conditions and retard spark. The retardation of spark occurs regardless of changed drive conditions. This results in suboptimal engine performance and fuel consumption.

SUMMARY

Accordingly, a knock reduction system for an internal combustion engine is provided. The system includes an engine operating zone selection module that selects a current engine operating zone from a plurality of engine operating zones based on engine speed, air per cylinder, and barometric pressure. A knock detection module generates a knock detection signal based on a detection of engine knock. An octane scaler adaptation module computes an octane scaler based on the current engine operating zone and the knock detection signal wherein engine spark is controlled based on the octane scaler.

In other features, a method of reducing knock for an internal combustion engine is provided. The method includes: selecting a current engine operating zone from a plurality of engine operating zones based on engine speed, air per cylinder, and barometric pressure; generating an knock detection signal based on a detection of engine knock; computing an octane scaler based on the current engine operating zone and the knock detection signal; and controlling engine spark based on the octane scaler.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
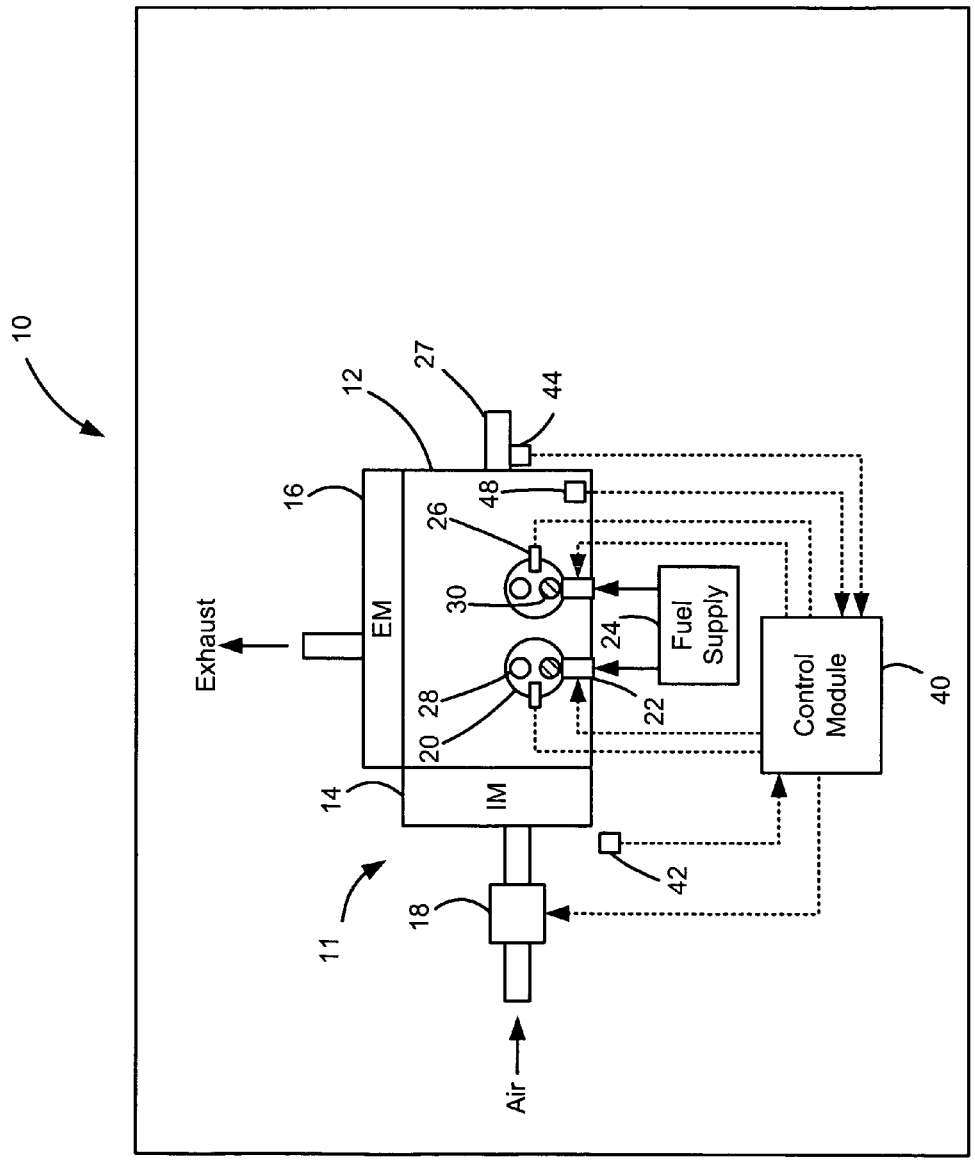
FIG. 1 is a functional block diagram of a vehicle including a knock reduction system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary vehicle 10 including an engine system 11 is schematically illustrated. The engine system 11 includes an engine 12, an intake manifold 14, and an exhaust manifold 16. As can be appreciated, the engine system 11 can be any engine system including an internal combustion engine. In various embodiments, the engine system 11 can include a Belt Alternator Starter (BAS) hybrid engine system. Air is drawn into the intake manifold 14 through a throttle 18. The air is directed into cylinders 20 and is mixed with fuel therein. The fuel is injected into the cylinders 20 by fuel injectors 22 that communicate with a fuel supply 24. Spark plugs 26 initiate combustion of the air/fuel mixture in their respective cylinders 20 and combustion exhaust exits the cylinders 20 and engine 12 through the exhaust manifold 16. Although only two cylinders 20 are illustrated, it can be appreciated that the vehicle 10 may include an engine 12 having more or fewer cylinders 20.

The combustion process drives pistons (not shown) that are disposed within the cylinders 20 and which, in turn rotatably drive a crankshaft 27. The engine 12 further includes intake and exhaust valves, 28,30 respectively, associated with each cylinder 20. The intake and exhaust valves 28,30 respectively regulate air intake into the cylinders 20 and exhaust of combustion gases from the cylinders 20.

A barometric pressure sensor 42 is responsive to an atmospheric pressure and generates a barometric pressure signal based thereon. An engine speed sensor 44 is responsive to rotation of the crankshaft 27 and generates an engine speed signal based thereon. A knock sensor 48 is responsive to vibration of the cylinders 20 and generates a knock signal based thereon. A control module 40 processes the knock signal to detect engine knock. Although a single knock sensor 48 is illustrated, it can be appreciated that multiple knock sensors 48 can be implemented.

The control module 40 regulates engine operation based on zone based knock reduction systems and methods of the present disclosure. More specifically, the control module 40 regulates spark timing relative to a position of the piston (not shown) in the cylinder 20 based on the presence and intensity of engine knock. Spark timing is determined from an octane scaler. The octane scaler is computed based on a zone based strategy as will be described in more detail below.

Figure 2:
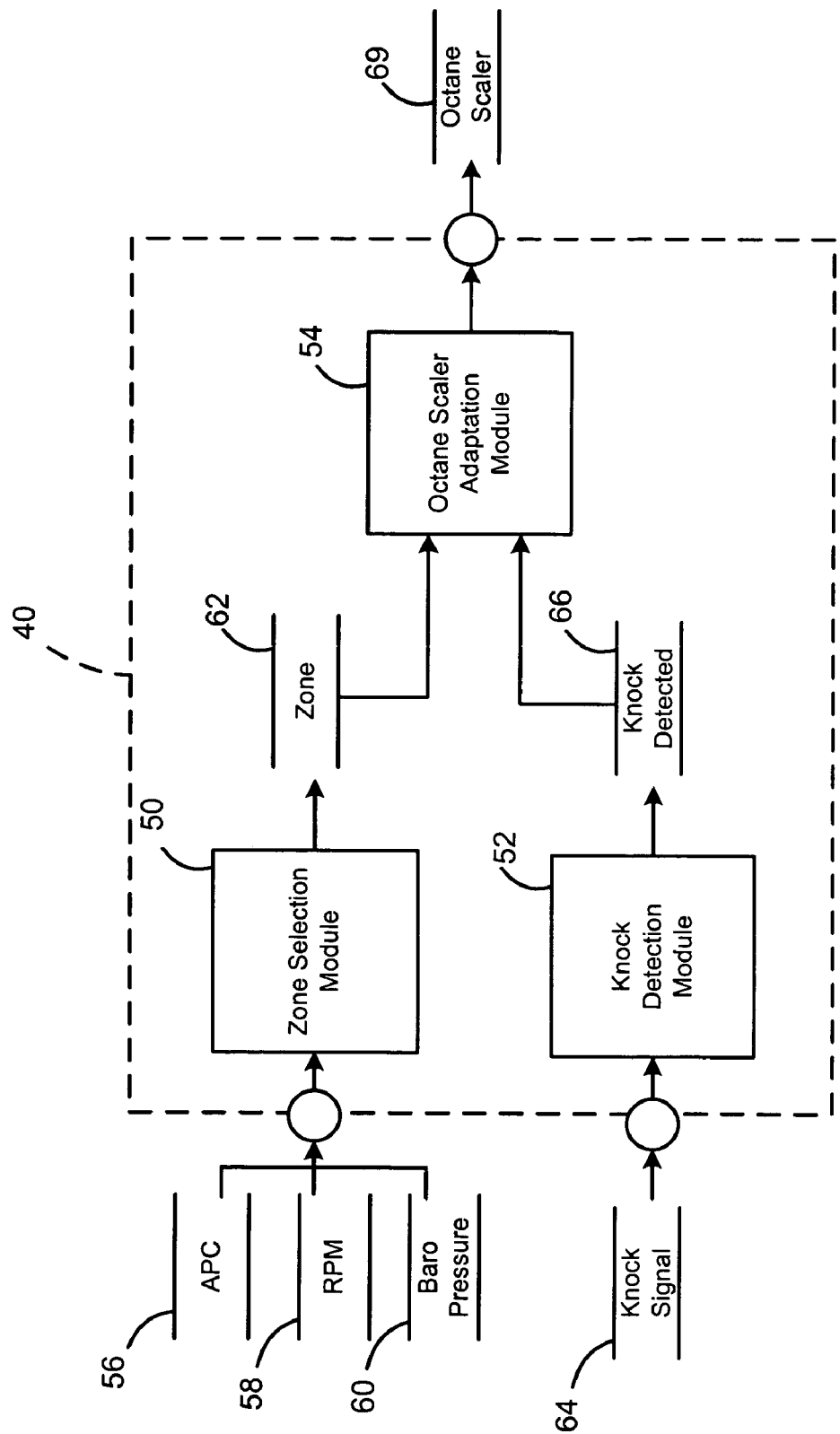
FIG. 2 is a dataflow diagram illustrating a engine operating zone based knock reduction system.

Referring now to FIG. 2, a dataflow diagram illustrates various embodiments of a zone based knock reduction system that may be embedded within the control module 40. Various embodiments of zone based knock reduction systems according to the present disclosure may include any number of sub-modules embedded within the control module 40. The sub-modules shown may be combined and/or further partitioned to similarly reduce engine knock. Inputs to the system may be sensed from the vehicle 10 (FIG. 1), received from other control modules (not shown) within the vehicle 10 (FIG. 1), and/or determined by other sub-modules (not shown) within the control module 40. In various embodiments, the control module of FIG. 2 includes an engine operating zone selection module 50, a knock detection module 52, and an octane scaler adaptation module 54.

Figure 3:
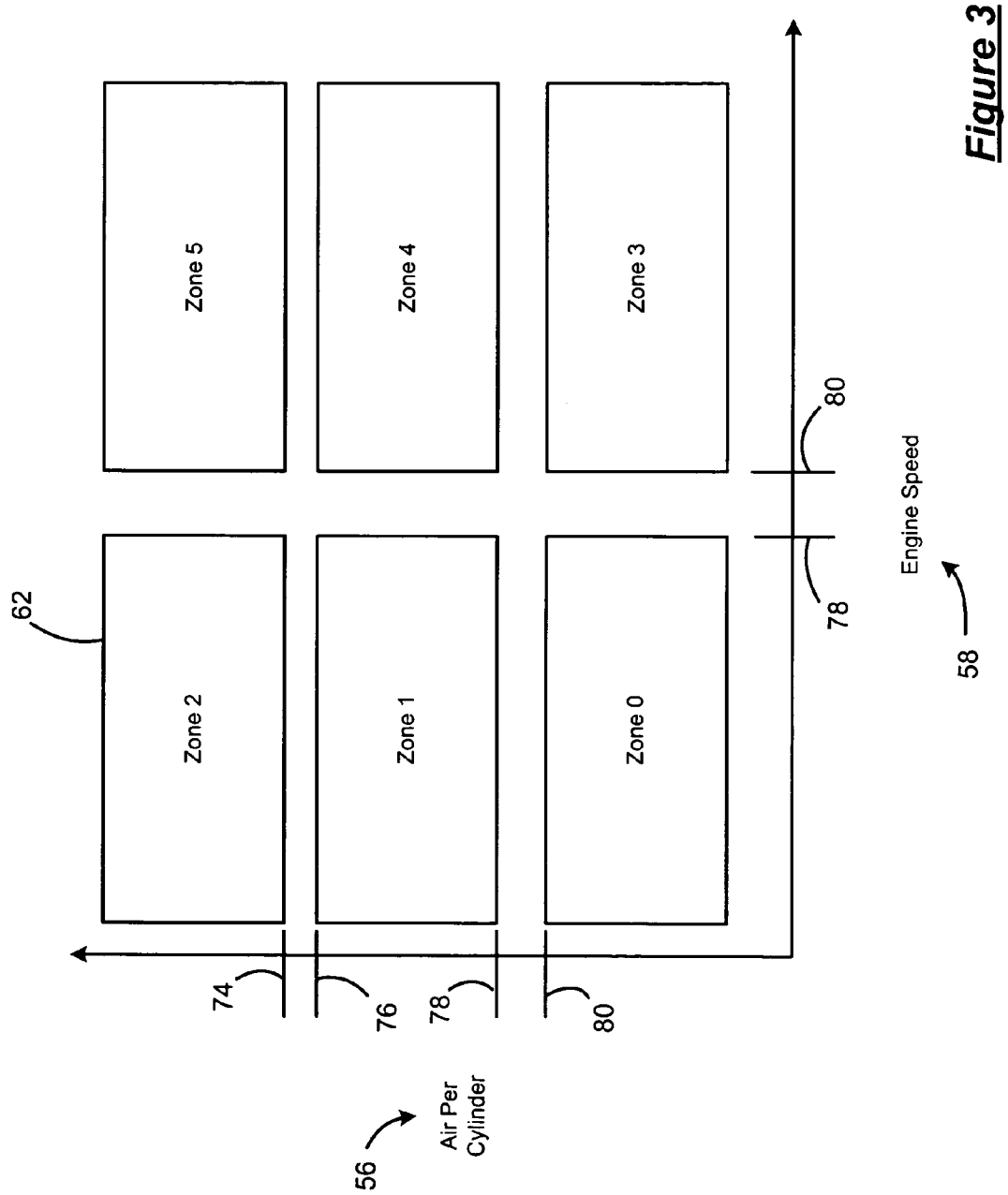
FIG. 3 is a graph illustrating exemplary engine operating zones of the zone based knock reduction system.

The engine operating zone selection module 50 receives as input air per cylinder (APC) 56, engine speed (RPM) 58, and barometric pressure 60. As can be appreciated, air per cylinder 56 can be determined by the control module 40 based on engine operating parameters. The engine operating zone selection module 50 selectively determines a current engine operating zone 62 based on engine speed 58, barometric pressure 60, and air per cylinder 56. More particularly a plurality of engine operating zones 62 can be defined by one or more predetermined engine speed hysteresis pairs and one or more predetermined air per cylinder hysteresis pairs. As shown in the example of FIG. 3, six engine operating zones (zone 0, zone 1, zone 2, zone 3, zone 4, zone 5, and zone 6) can be defined by a predetermined engine speed hysteresis pair 70,72 that differentiates zone 0, zone 1, and zone 2 from zone 3, zone 4, and zone 5 and two predetermined air per cylinder hysteresis pairs 74,76 and 78,80 that differentiate the different zones. The air per cylinder hysteresis pairs 74,76 and 78,80 can be compensated by barometric pressure conditions. Therefore, based on the current engine speed 58, air per cylinder 56, and barometric pressure 60 a current engine operating zone 62 can be selected. It can be appreciated that fewer or more engine operating zones can be defined. Defining more engine operating zones will result in better engine performance and fuel economy. Defining fewer engine operating zones will reduce memory consumption and increase processor throughput.

Referring back to FIG. 2, the knock detection module 52 receives as input one or more knock signals 64 received from the one or more knock sensors 48 (FIG. 1). The knock detection module 52 detects excessive knock based on a comparison of the knock signal 64 and a predetermined knock intensity threshold. The knock detection module 52 sets a knock detection flag 66 accordingly. It can be appreciated that one or more knock detection flags 66 can be set according to the number of knock sensors 48 (FIG. 1) and/or the number of cylinders 20 (FIG. 1).

The octane scaler adaptation module 54 receives as input the current engine operating zone 62 and the knock detection flag 66. The octane scaler adaptation module 54 computes an octane scaler 69 and associates it with the current engine operating zone 62. When the engine system 11 (FIG. 1) is operating in a particular engine operating zone, the computed octane scaler allows the engine system 11 (FIG. 1) to control spark to transition between a minimum advance for best timing (MBT) spark and a base spark based on whether knock is detected. For example, the octane scaler 69 is incremented if a new knock event is detected. Otherwise, the octane scaler is decremented to allow the engine system 11 (FIG. 1) to recover from knock by learning back to MBT. In engine systems 11 implementing individual spark control for each cylinder 20, a separate octane scaler can be computed for each cylinder 20 or group of cylinders 20 as will be discussed in more detail below.

Figure 4:
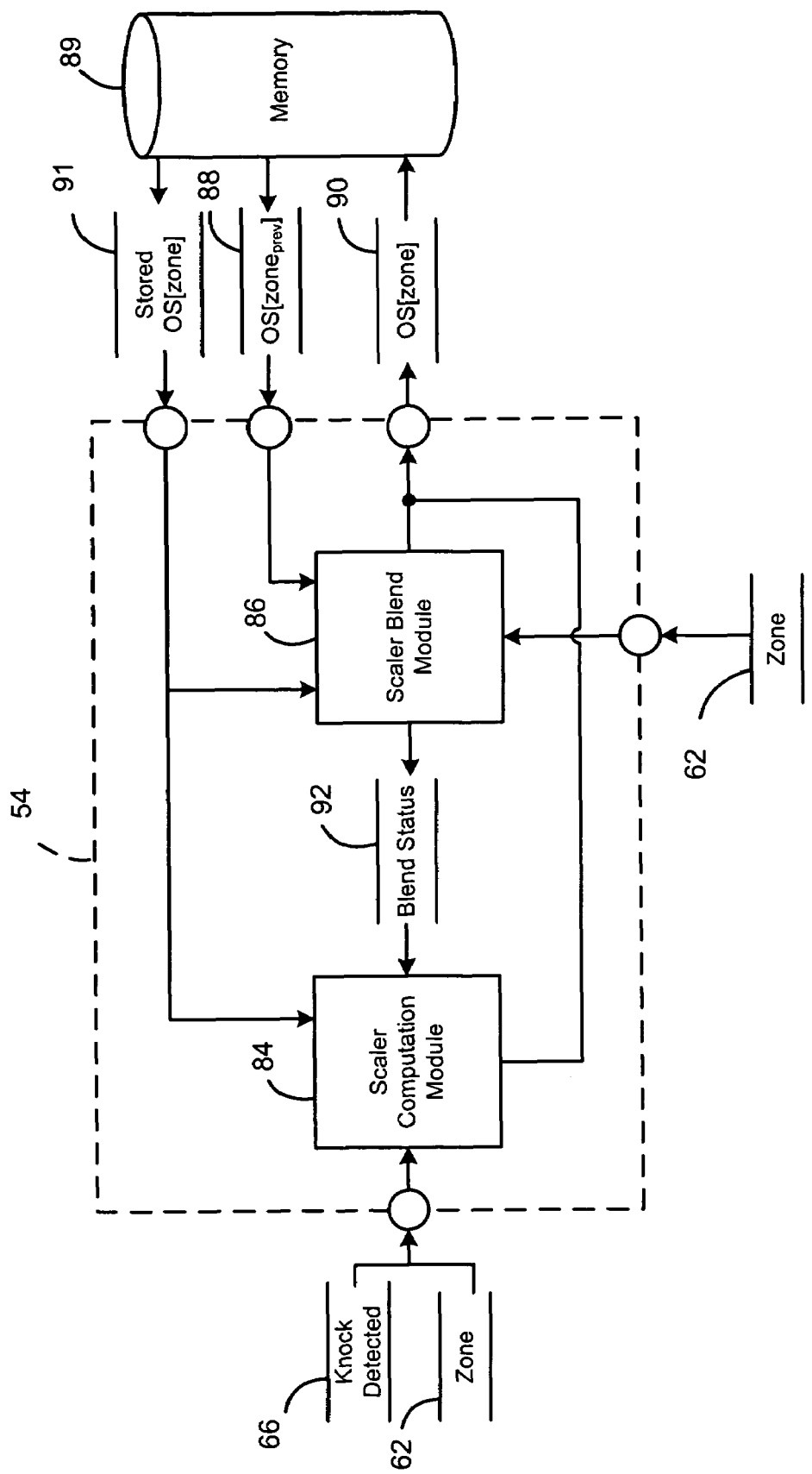
FIGS. 4 and 5 are dataflow diagrams illustrating various embodiments of an octane scaler adaptation system.

Referring now to FIG. 4, the octane scaler adaptation module 54 of FIG. 2 will be discussed in more detail. The octane scaler adaptation system includes a scaler computation module 84 and a scaler blend module 86. As can be appreciated, the modules shown can be combined and/or further partitioned to similarly compute an octane scaler. The scaler computation module 84 receives as input the knock detection flag 66, the current engine operating zone 62, and a stored octane scaler 91. The stored octane scaler 91 is the computed octane scaler that was stored in memory 89 the last time the engine system 11 was operating in the particular engine operating zone 62. The scaler computation module 84 initializes the current octane scaler 90 to the stored octane scaler 91 and thereafter adapts the current octane scaler 90 for the current engine operating zone based on one of at least two methods. The scaler computation module 84 increments the octane scaler toward a base value when knock is detected. The scaler computation module 84 decrements the octane scaler toward MBT when knock is not detected. Table 1 illustrates the relationships between knock, octane scaler, and spark.

TABLE 1

| Knock Occurs? | Octane Scaler Moves Towards | Spark Moves Towards |
|---|---|---|
| Yes | 1 | Low Octane table |
| No | 0 | High Octane table |

The incrementing and decrementing of the current octane scaler 90 allows spark control to transition between low octane and high octane levels. The low octane and high octane levels can be derived from predetermined spark tables stored in memory 89.

The scaler computation module 84 may increment or decrement the octane scaler for each engine operating zone (OS[zone]) based on at least one of the stored octane scaler (Stored OS[zone]), an increment rate (IR) determined as a function of a current value of fast knock retard for the current engine operating zone (FKR[zone]), a gain value (Gain) determined as a function of spark (Spark), a learned gain ($Gain_{learn}$), and a predetermined decrement rate (DR). In various embodiments, the octane scaler (OS[zone]) 90 is incremented based on the following equation:

$$OS[\text{zone}] = StoredOS[\text{zone}] + [IR(FNR[\text{zone}]) * \text{Gain} (\Delta\text{Spark}) * Gain_{learn}]. \quad (1)$$

In various embodiments, the octane scaler (OS[zone]) 90 is decremented based on the following equation:

$$OS[\text{zone}] = StoreOS[\text{zone}] - [DR * \text{Gain}(\Delta\text{Spark}) * Gain_{learn}]. \quad (2)$$

The gain is used to limit the movement of the octane scaler when there is little difference between the high octane table value and the low octane value derived from the two tables. The gain can be determined as a function of the difference between the two values derived from the two tables. The learned gain takes into account the propensity to knock at the current engine operating conditions. The learned gain increases the step in engine operating conditions where knock is likely to occur. The learned gain will decrease the step size if the engine is not likely to knock under the current operating conditions.

The scaler blend module 86 receives as input the stored octane scaler of the current engine operating zone 91, the octane scaler of the previous engine operating zone 88, and the current engine operating zone 62. The scaler blend module 86 blends the octane scaler when transitioning between engine operating zones. The scaler blend module 86 blends the stored octane scaler of the current engine operating zone 91 when transitioning between engine operating zones based on one of at least three blend methods. The first method includes no blending. The computed octane scaler of the current engine operating zone 90 is used immediately if a difference between an octane scaler of the previous engine operating zone 88 and the stored octane scaler of the current engine operating zone 90 is below a predetermined delta threshold or the blend step is merely not desired (e.g., setting a predetermined enable flag to FALSE). The second method includes using an increasing blend if the stored octane scaler of the current engine operating zone 91 is greater than the octane scaler of a previous engine operating zone 88. The third method includes using a decreasing blend if the stored octane scaler of the current engine operating zone 91 is less than the octane scaler of the previous engine operating zone 88.

In various embodiments, a blend step (BS) is computed based on the stored octane scaler for the current engine operating zone (Stored OS[zone]) the computed octane scaler for the current engine operating zone OS[zone] and based on one of at least two equations:

$$BS = (StoredOS[zone] - OS[zone])/DecCount; \text{ and} \quad (3)$$

$$BS = (OS[zone] - StoredOS[zone])/IncCount. \quad (4)$$

Where DecCount represents a predetermined value for a decreasing count and IncCount represents a predetermined value for an increasing count. The blend step (BS) is either added to or subtracted from the stored octane scaler of the current engine operating zone 91 based on whether increasing or decreasing blending is needed. The result is then set equal to the octane scaler of the current engine operating zone 90. The octane scaler of the current engine operating zone 90 can be stored in memory 89 for use by the engine system 11 (FIG. 1). In various embodiments, the memory 89 is a non-volatile type memory. This allows the octane scaler for each engine operating zone to be preserved across drive cycles.

It can be appreciated that the methods of the scaler computation module 84 and the scaler blend module 86 can be mutually exclusive. For example, once the scaler blend module 86 completes the blend method, a blend status flag 92 is set to COMPLETE. The scaler computation module 84 receives as input the blend status flag 92 and performs the incrementing and decrementing of the octane scaler of the current engine operating zone 90 when the blend status flag 92 indicates COMPLETE.

Figure 5:
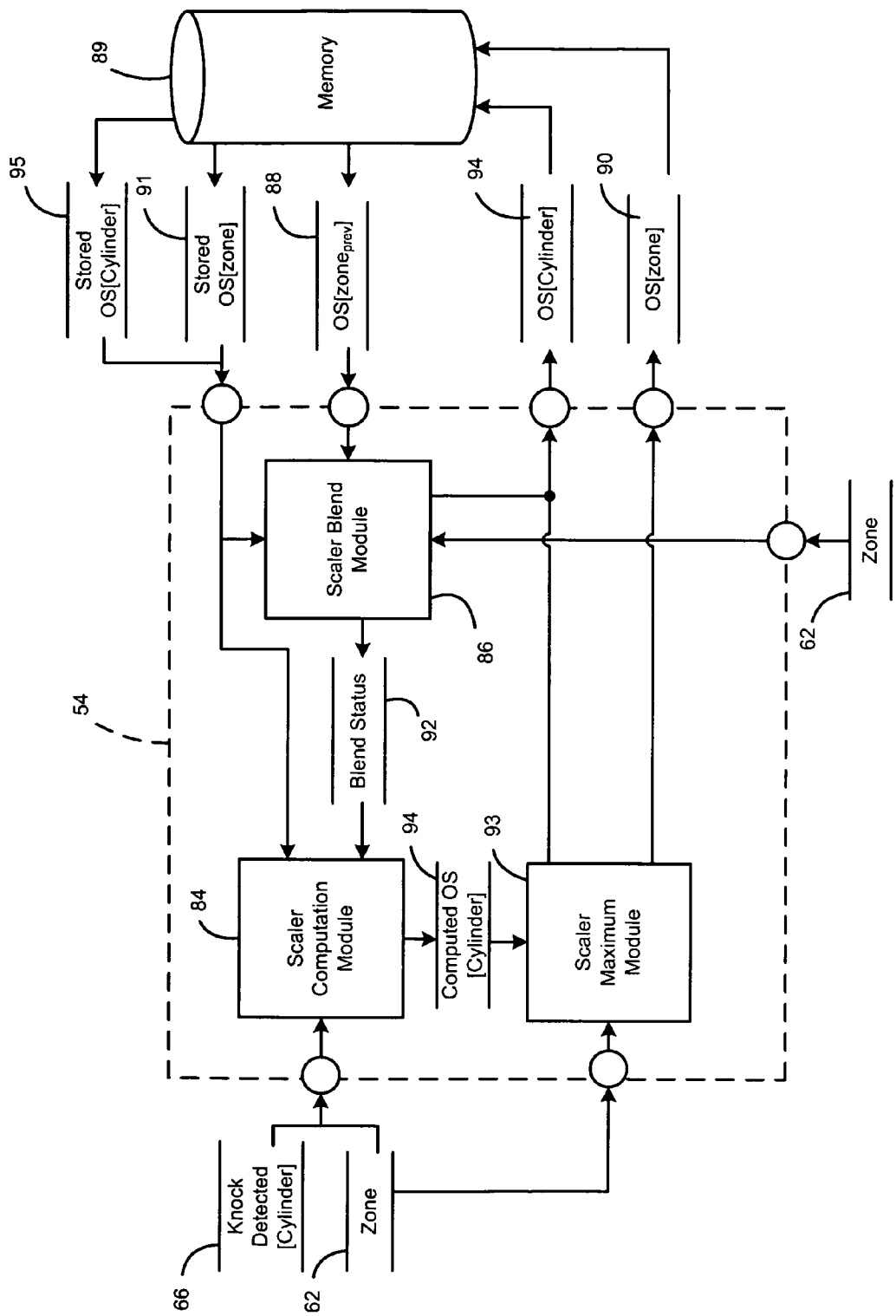

Referring now to FIG. 5, a dataflow diagram illustrates various other embodiments of the octane scaler adaptation module 54 of FIG. 2. The octane scaler adaptation module 54 computes an octane scaler for each cylinder while operating within each engine operating zone. The octane scaler adaptation system can include a scaler computation module 84, a scaler maximum module 93, and a scaler blend module 86. As can be appreciated, the modules shown can be combined and/or further partitioned to similarly compute an octane scaler or each cylinder and each engine operating zone.

The scaler computation module 84 receives as input the knock detection flag 66 corresponding to the cylinder where knock was detected, the current engine operating zone 62, a stored octane scaler 91 corresponding to the current engine operating zone, and a stored octane scaler corresponding to a cylinder 95. The scaler computation module 84 initializes the octane scalers for each cylinder to the stored octane scaler 91. Thereafter, the scaler computation module 84 computes an octane scaler for each cylinder 94 based on the incrementing and decrementing methods as discussed above. More specifically, the scaler computation module 84 increments the octane scaler toward a base value when knock is detected. The scaler computation module 84 decrements the octane scaler toward MBT when knock is not detected.

The scaler computation module 84 may increment or decrement the octane scaler for each cylinder (OS[cylinder]) based on at least one of the stored octane scaler of the current cylinder (Stored OS[cylinder]), an increment rate (IR) determined as a function of a current value of fast knock retard of the current engine operating zone and current cylinder (FKR[zone][cylinder]), a gain value (Gain) determined as a function of spark (Spark), the learned gain ($Gain_{learn}$), and a predetermined decrement rate (DR).

In various embodiments, the octane scaler is incremented based on the following equation:

$$OS[cylinder] = StoredOS[cylinder] + [IR(FNR[zone][cylinder]) * Gain(\Delta Spark) * Gain_{learn}]. \quad (5)$$

In various embodiments, the octane scaler is decremented based on the following equation:

$$OS[cylinder] = StoredOS[cylinder] + [DR * Gain(\Delta Spark) * Gain_{learn}]. \quad (6)$$

The scaler maximum module 93 receives as input the computed octane scaler for each cylinder 94 and the current engine operating zone 62. The scaler maximum module 93 determines a scaler maximum (maxOS) of the computed octane scalers for each cylinder. The octane scaler for the current engine operating zone 90 is set equal to the maximum and stored in memory 89. The scaler maximum module 93 can also limit the delta between the computed octane scalers for the individual cylinders 20 and the maximum. For example, the octane scaler for each cylinder is limited by a maximum of either the maximum minus a predetermined delta (MaxDelt) or the current value of octane scaler for the particular cylinder as shown as:

$$OS[cylinder] = Max[maxOS - MaxDelt, OS[cylinger]]. \quad (7)$$

The scaler blend module 86 blends the stored octane scaler of the current engine operating zone 91 and the octane scaler of the previous engine operating zone 88 when transitioning between each engine operating zone 62 as discussed above. The scaler blend module 86 then sets the octane scaler for each cylinder to the blended octane scaler and stores the octane scaler for each cylinder in memory 89. As discussed above, the memory 89 may be a non-volatile type memory.

Figure 6:
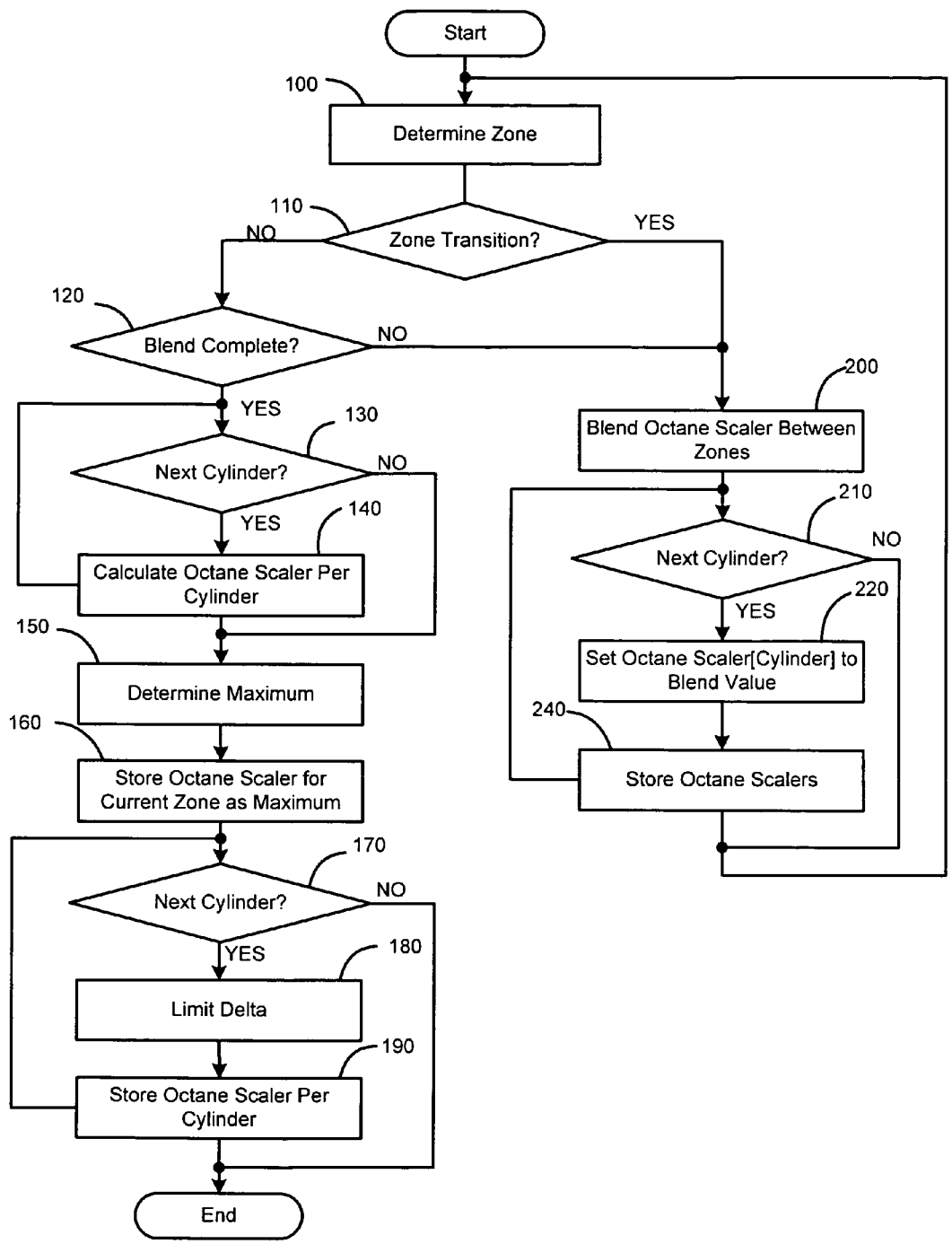
FIGS. 6 and 7 are flowcharts illustrating various embodiments of zone based knock reduction methods.

Referring now to FIG. 6, a flowchart illustrates a zone based knock reduction method as performed by the control module 40 of FIG. 1. The method may be run continually during engine operation. The method may be implemented for engine systems including individual spark control for each cylinder. At 100, the current engine operating zone is determined based on engine speed, barometric pressure, and air per cylinder. If the current engine operating zone does not equal the previous engine operating zone, the engine system is transitioning between engine operating zones. Otherwise the engine system is not transitioning between engine operating zones. If the engine system is not transitioning between engine operating zones at 110, control evaluates whether the blend is complete at 120. If the blend is complete at 120, for each cylinder at 130, an octane scaler is computed at 140 as discussed above. Once an octane scaler is computed for each cylinder, a maximum of the octane scalers is determined at 150. Control then sets the octane scaler of the current engine operating zone (OS[zone]) to the maximum and stores the octane scaler of the current engine operating zone in memory at 160. For each cylinder at 170, control limits the octane scaler (OS[cylinder]) based on the maximum at 180. The octane scaler for each cylinder (OS[cylinder]) is stored in memory at 190.

Otherwise, if the engine system is transitioning between engine operating zones at 110 or the blend is not complete at 120, blending is performed at 190 as discussed above. For each cylinder at 200, the octane scaler (OS[cylinder]) is set equal to the blend value at 210 and stored in memory at 220. The blend method continues until the blending is complete at 120. The blend may be complete once the octane scaler of the cylinder (OS[cylinder]) is equal to the octane scaler of the current engine operating zone (OS[zone]).

Figure 7:
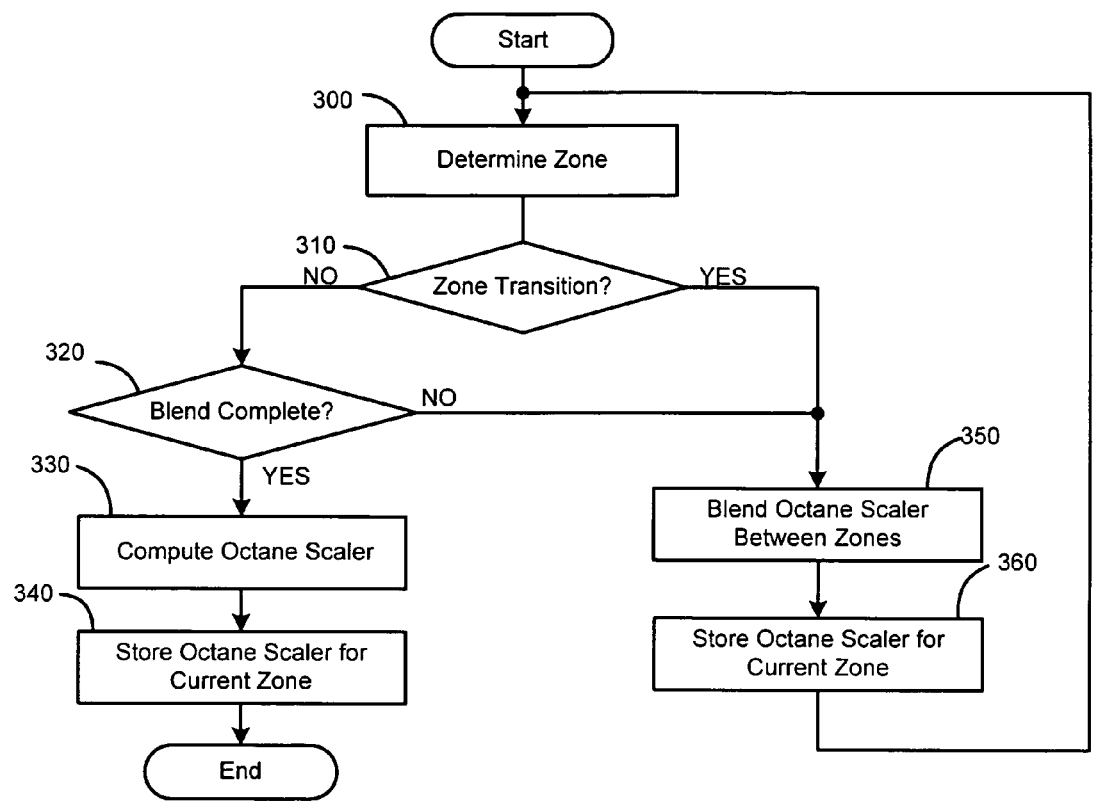

Similarly, a single octane scaler for each engine operating zone (OS[zone]) can be computed as shown by the engine operating zone based knock reduction method in FIG. 7. At 300, the current engine operating zone is determined based on engine speed, barometric pressure, and air per cylinder. If the engine system is not transitioning between engine operating zones at 310, control evaluates whether blend is complete at 320. If the blend is complete at 320, an octane scaler (OS[zone]) is computed at 330 and stored in memory at 340.

Otherwise, if the engine system is transitioning between engine operating zones at 310 or the blend is not complete at 320, blending of the octane scaler (OS[zone]) is performed at 350 and stored in memory at 360. The blend method continues until the blending is complete at 320. The blend may be complete once the octane scaler of the current engine operating zone reaches the stored octane scaler of the current engine operating zone.

As can be appreciated, all comparisons discussed above can be implemented in various forms depending on the selected values for comparison. For example, a comparison of "greater than" may be implemented as "greater than or equal to" in various embodiments. Similarly, a comparison of "less than" may be implemented as "less than or equal to" in various embodiments. A comparison of "within a range" may be equivalently implemented as a comparison of "less than or equal to a maximum threshold" and "greater than or equal to a minimum threshold" in various embodiments.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A knock reduction system for an internal combustion engine, comprising:
   an engine operating zone selection module that selects a current engine operating zone from a plurality of engine operating zones based on engine speed, air per cylinder, and barometric pressure;
   a knock detection module that generates a knock detection signal based on a detection of engine knock; and
   an octane scaler adaptation module that computes an octane scaler based on the current engine operating zone and the knock detection signal wherein engine spark is controlled based on the octane scaler.

2. The system of claim 1 wherein the octane scaler adaptation module increments the octane scaler when the knock detection signal indicates that knock is detected.

3. The system of claim 1 wherein the octane scaler adaptation module decrements the octane scaler when the knock detection signal indicates that knock is not detected.

4. The system of claim 1 wherein the octane scaler adaptation module computes the octane scaler based on at least one of a stored octane scaler, an increment rate determined as a function of fast knock retard, a gain value determined as a function of spark, a learned gain, and a predetermined decrement rate.

5. The system of claim 1 further comprising a scaler blend module that blends an octane scaler of the current engine operating zone with a computed octane scaler of a previous engine operating zone when transitioning between engine operating zones wherein the blending is based on a computed blend step.

6. The system of claim 1 wherein the knock detection module detects engine knock for a plurality of cylinders of the internal combustion engine, wherein the octane scaler adaptation module computes an octane scaler for each of the plurality of cylinders, and wherein engine spark is individually controlled for each of the plurality of cylinders based on the octane scaler associated with the cylinder.

7. The system of claim 6 further comprising a scaler maximum module that determines a maximum of the computed octane scalers for each of the plurality of cylinders and associates the maximum with the current engine operating zone.

8. The system of claim 7 wherein the scaler maximum module limits the octane scaler for each of the plurality of cylinders based on the maximum and a delta limit.

9. The system of claim 1 wherein the plurality of engine operating zones are defined by at least one engine speed hysteresis pair and one air per cylinder hysteresis pair.

10. The system of claim 9 wherein the at least one air per cylinder hysteresis pair is compensated by barometric pressure.

11. The system of claim 1 wherein the knock detection module generates the knock detection signal based on a comparison of a first knock detection signal received from a knock sensor and a knock intensity threshold.

12. The system of claim 1 further comprising a spark control module that controls spark to the internal combustion engine based on the octane scaler and wherein the internal combustion engine is a Belt Alternator Starter hybrid engine.

13. A method of reducing knock for an internal combustion engine, comprising selecting a current engine operating zone from a plurality of engine operating zones based on engine speed, air per cylinder, and barometric pressure;

generating a knock detection signal based on a detection of engine knock;

computing an octane scaler based on the current engine operating zone and the knock detection signal; and controlling engine spark based on the octane scaler.

14. The method of claim 13 wherein the computing comprises incrementing the octane scaler when the knock detection signal indicates that knock is detected.

15. The method of claim 13 wherein the computing comprises decrementing the octane scaler when the knock detection signal indicates that knock is not detected.

16. The method of claim 13 wherein computing comprises computing the octane scaler based on at least one of a stored octane scaler of the current cylinder, an increment rate determined as a function of a current value of fast knock retard, a gain value determined as a function of spark, a learned gain, and a predetermined decrement rate.

17. The method of claim 13 further comprising blending an octane scaler of the current engine operating zone with a computed octane scaler of a previous engine operating zone when transitioning between engine operating zones wherein the blending is based on a computed blend step.

18. The method of claim 13 wherein the detecting comprises detecting engine knock for each of a plurality of cylinders of the internal combustion engine, wherein the computing comprises computing an octane scaler for each of the plurality of cylinders, and wherein engine spark is individually controlled for each of the plurality of cylinders based on the octane scaler for each of the plurality of cylinders.

19. The method of claim 18 further comprising determining a maximum of the computed octane scalers for each of the plurality of cylinders and associating the maximum with the current engine operating zone.

20. The method of claim 19 further comprising limiting the octane scaler for each of the plurality of cylinders based on the maximum and a delta limit.

21. The method of claim 13 further comprising defining the plurality of engine operating zones by at least one engine speed hysteresis pair and at least one air per cylinder hysteresis pair.

22. The method of claim 21 further comprising compensating the at least one air per cylinder hysteresis pair by barometric pressure.

23. The method of claim 13 further comprising receiving a first knock detection signal from a knock sensor and generating the knock diction signal based on a comparison of the first knock detection signal and a knock intensity threshold.

24. The method of claim 13 wherein the controlling spark comprises controlling spark to a Belt Alternator Starter hybrid engine based on the octane scaler.

* * * * *